United States Patent
Kobayashi et al.

(10) Patent No.: US 8,430,790 B2
(45) Date of Patent: Apr. 30, 2013

(54) POWER TRANSMISSION CONTROLLING APPARATUS

(75) Inventors: Nobufusa Kobayashi, Anjo (JP);
Hideaki Otsubo, Miyoshi (JP);
Yukihiko Ideshio, Nissin (JP);
Terufumi Miyazaki, Toyota (JP);
Shingo Eto, Gamagori (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/995,241

(22) PCT Filed: Mar. 1, 2010

(86) PCT No.: PCT/JP2010/053280
§ 371 (c)(1),
(2), (4) Date: Nov. 30, 2010

(87) PCT Pub. No.: WO2011/108070
PCT Pub. Date: Sep. 9, 2011

(65) Prior Publication Data
US 2012/0316028 A1    Dec. 13, 2012

(51) Int. Cl.
| | |
|---|---|
| B60W 10/02 | (2006.01) |
| B60W 10/08 | (2006.01) |
| B60W 10/04 | (2006.01) |
| B60W 10/00 | (2006.01) |
| B60W 20/00 | (2006.01) |
| H02P 15/00 | (2006.01) |

(52) U.S. Cl.
USPC .................. 477/5; 477/6; 477/8; 180/65.265; 180/65.285

(58) Field of Classification Search .................. 477/5, 6, 477/8; 180/65.265, 65.285
See application file for complete search history.

(56) References Cited

U.S. PATENT DOCUMENTS

| | | | |
|---|---|---|---|
| 6,974,009 B2 * | 12/2005 | Hoshiya et al. | 192/3.63 |
| 7,472,769 B2 * | 1/2009 | Yamanaka et al. | 180/65.25 |
| 2007/0207892 A1 | 9/2007 | Dreibholz et al. | |

(Continued)

FOREIGN PATENT DOCUMENTS

| | | |
|---|---|---|
| JP | A-2000-103259 | 4/2000 |
| JP | A-2003-200758 | 7/2003 |

(Continued)

OTHER PUBLICATIONS

May 15, 2012 Decision of a Patent Grant issued in Japanese Patent Application No. 2010-540358 (with translation).

(Continued)

*Primary Examiner* — Tisha Lewis
(74) *Attorney, Agent, or Firm* — Oliff & Berridge, PLC

(57) ABSTRACT

A power transmission controlling apparatus of a vehicle includes a clutch capable of connecting/disconnecting power transmission between an engine and a motor/generator, and a torque converter enabling power transmission between the engine or/and the motor/generator and an automatic transmission. When the engine is started by motoring torque with engagement of the clutch during rotation of the motor/generator, the power transmission controlling apparatus sets a torque compensation amount by the motor/generator based on an estimated torque capacity of the clutch, and suppresses torque fluctuations on a power transmission path accompanying engagement of the clutch by power of the motor/generator containing the torque compensation amount. The power transmission controlling apparatus corrects the torque capacity or the torque compensation amount based on input torque of the torque converter.

8 Claims, 8 Drawing Sheets

U.S. PATENT DOCUMENTS

| | | | |
|---|---|---|---|
| 2007/0246273 A1 | 10/2007 | Tenbrock et al. | |
| 2007/0246274 A1 | 10/2007 | Dreibholz et al. | |
| 2007/0246275 A1 | 10/2007 | Dreibholz et al. | |
| 2009/0124453 A1 | 5/2009 | Seel et al. | |
| 2011/0035085 A1* | 2/2011 | Falkenstein | 701/22 |

FOREIGN PATENT DOCUMENTS

| | | |
|---|---|---|
| JP | A-2007-284057 | 11/2007 |
| JP | A-2007-320550 | 12/2007 |
| JP | A-2007-326556 | 12/2007 |
| JP | A-2007-326557 | 12/2007 |
| JP | A-2010-505698 | 2/2010 |

OTHER PUBLICATIONS

International Search Report issued in International Application No. PCT/JP2010/053280 on Jun. 1, 2010 (with translation).

* cited by examiner

POWER TRANSMISSION CONTROLLING APPARATUS

FIELD

The present invention relates to a power transmission controlling apparatus of a vehicle including a mechanical power source that generates a driving force by using mechanical energy as power, an electric power source that generates a driving force by using mechanical energy obtained by converting electric energy as power, a power connecting/disconnecting device having an engagement unit capable of connecting/disconnecting power transmission between the mechanical power source and the electric power source, and a fluid coupling that enables power transmission between the mechanical power source or the electric power source and a transmission.

BACKGROUND

Patent Literature 1 below discloses a conventional technology that, in a drive controlling apparatus of a hybrid vehicle in which a clutch is provided between an engine as a mechanical power source and a motor as an electric power source, transmits rotation of the motor to the engine with engagement of the clutch, thereby starting the engine. In the drive controlling apparatus, when the engine is started from a state of running (so-called EV running) with power of the motor (motoring torque) only, the clutch is engaged whereby motoring torque is increased only by a torque capacity of the clutch at that point. With the increase in motoring torque, the drive controlling apparatus attempts to control a reduction in driving force accompanying engagement of the clutch, that is, pulling-in of the speed (slowdown) accompanying engagement of the clutch and also attempts to suppress a torque shock when the engine is started.

CITATION LIST

Patent Literature

Patent Literature 1: Japanese Patent Application Laid-open No. 2003-200758

SUMMARY

Technical Problem

When torque compensation by motoring torque (hereinafter, referred to as "MG torque compensation") is made, highly precise torque capacity information of a clutch is needed. However, it is difficult to estimate the torque capacity with high precision. Therefore, if highly precise torque capacity information cannot be obtained, it has been difficult to make correct MG torque compensation because an increase in motoring torque deviates from an originally needed increase.

An object of the present invention is to provide a power transmission controlling apparatus capable of improving problems of such conventional examples and making MG torque compensation with high precision.

Solution to Problem

In order to achieve the above mentioned object, a power transmission controlling apparatus of a vehicle, according to the present invention, includes a power connecting/disconnecting device that has an engagement unit capable of connecting/disconnecting power transmission between a mechanical power source and an electric power source; and a fluid coupling that enables power transmission between the mechanical power source or/and the electric power source and a transmission, where the power connecting/disconnecting device and the fluid coupling are disposed on a power transmission path on which power of at least one of the mechanical power source generating a driving force by using mechanical energy and the electric power source generating the driving force by using the mechanical energy obtained by converting electric energy can be transmitted to drive wheels, and when the mechanical power source is started by the power of the electric power source with engagement of the power connecting/disconnecting device during rotation of a rotation axis of the electric power source, the power transmission controlling apparatus sets a torque compensation amount by the electric power source based on an estimated torque capacity of the power connecting/disconnecting device and suppresses torque fluctuations on the power transmission path accompanying the engagement of the power connecting/disconnecting device by the power of the electric power source containing the torque compensation amount, wherein the power transmission controlling apparatus corrects the torque capacity or the torque compensation amount based on input torque of the fluid coupling.

Here, it is desirable that the power transmission controlling apparatus sets a difference between input torque of the fluid coupling and torque of the electric power source containing the torque compensation amount as a correction value for the torque capacity or the torque compensation amount.

Further, it is desirable that the power transmission controlling apparatus sets a correction value determined based on input torque of the fluid coupling as a correction value for the torque capacity or the torque compensation amount when the mechanical power source is started next time.

Further, it is desirable that the power transmission controlling apparatus determines a correction value for the torque capacity or the torque compensation amount when the mechanical power source is started next time, based on all or a plurality of correction values determined based on input torque of the fluid coupling.

Further, it is desirable that the power transmission controlling apparatus determines a correction value associated with a degree of progress of engagement control of the power connecting/disconnecting device based on input torque of the fluid coupling, and sets the correction value as a correction value for the torque capacity or the torque compensation amount when the mechanical power source is started next time.

Further, it is desirable that the power transmission controlling apparatus determines a correction value associated with a degree of progress of engagement control of the power connecting/disconnecting device based on input torque of the fluid coupling, and determines a correction value for the torque capacity or the torque compensation amount when the mechanical power source is started next time based on all or a plurality of the correction values.

Further, it is desirable that the power transmission controlling apparatus determines a correction value associated with a degree of progress of engagement control of the power connecting/disconnecting device based on input torque of the fluid coupling, corrects a characteristic value of the power connecting/disconnecting device based on the correction value, and estimates the torque capacity using the characteristic value after being corrected. At this time, it is preferable that the power transmission controlling apparatus determines a correction value for a characteristic value of the power connecting/disconnecting device based on a correction value associated with a degree of progress of engagement control of the power connecting/disconnecting device.

Advantageous Effects of Invention

A power transmission controlling apparatus according to the present invention corrects a torque capacity or torque compensation amount based on input torque of a fluid coupling and thus, torque compensation can be made by an electric power source with an appropriate torque compensation amount. The power transmission controlling apparatus reduces variations due to an estimation error of the torque capacity by setting a correction value determined based on the input torque of the fluid coupling or a correction value determined based on the correction value as the correction value for the torque capacity or torque compensation amount when a mechanical power source is started next time so that appropriate torque compensation can be made also when the mechanical power source is started next time. The power transmission controlling apparatus also reduces variations due to an estimation error of the torque capacity in accordance with a degree of progress by determining a correction value associated with the degree of progress of engagement control of a power connecting/disconnecting device based on the input torque of the fluid coupling and setting the correction value or a correction value determined based on the correction value as the correction value for the torque capacity or torque compensation amount when the mechanical power source is started next time so that appropriate torque compensation can be made also when the mechanical power source is started next time. The power transmission controlling apparatus also reduces variations due to an estimation error of the torque capacity in accordance with the degree of progress by correcting a characteristic value of the power connecting/disconnecting device based on a correction value associated with the degree of progress of the engagement control of the power connecting/disconnecting device and estimating the torque capacity by using the characteristic value after being corrected so that appropriate torque compensation can be made also when the mechanical power source is started next time.

DESCRIPTION OF EMBODIMENTS

A power transmission controlling apparatus according to the present invention includes a power connecting/disconnecting device having an engagement unit capable of connecting/disconnecting power transmission between a mechanical power source and an electric power source and a fluid coupling enabling power transmission between the mechanical power source or/and the electric power source and a transmission, on a power transmission path on which power of at least one of the mechanical power source generating a driving force by using mechanical energy and the electric power source generating the driving force by using the mechanical energy obtained by converting electric energy can be transmitted to drive wheels. When the mechanical power source is started by the power of the electric power source with engagement of the power connecting/disconnecting device during rotation of a rotation axis of the electric power source, the power transmission controlling apparatus sets a torque compensation amount by the electric power source based on an estimated torque capacity of the power connecting/disconnecting device and suppresses torque fluctuations on the power transmission path accompanying the engagement of the power connecting/disconnecting device with the power of the electric power source containing the torque compensation amount. Then, the power transmission controlling apparatus corrects the torque capacity or the torque compensation amount based on input torque of the fluid coupling. Embodiments of the power transmission controlling apparatus according to the present invention will be described in detail below based on drawings. However, the present invention is not limited by these embodiments.

First Embodiment

Figure 1:
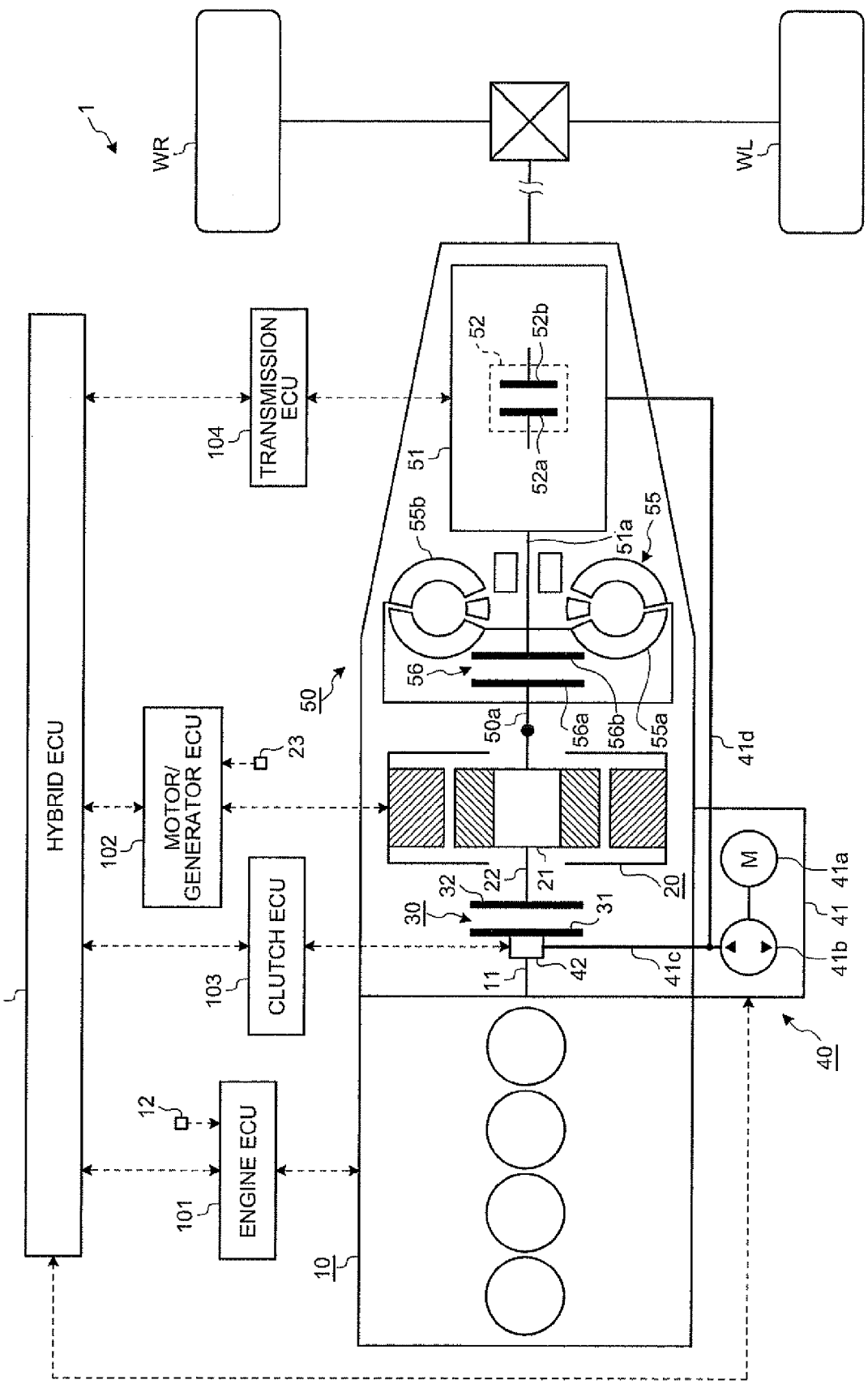
FIG. 1 is a diagram illustrating an example of a power transmission controlling apparatus according to the present invention and an applied vehicle thereof.

The first embodiment of a power transmission controlling apparatus according to the present invention will be described based on FIGS. 1 to 3.

First, an example of a vehicle on which a power transmission system is mounted, to the power transmission system a power transmission controlling apparatus according to the first embodiment is applied, will be described based on FIG. 1. Reference numeral 1 in FIG. 1 shows a hybrid vehicle including a mechanical power source using mechanical energy as power, an electric power source using mechanical energy obtained by converting electric energy as power, and a power transmission system capable of transmitting power of the mechanical power source or electric power source to drive wheels. The power transmission system according to the first embodiment has a power connecting/disconnecting device capable of connecting/disconnecting power transmission between the mechanical power source and the electric power source, and a fluid coupling that enables power transmission between the mechanical power source or/and the electric power source and a transmission disposed therein.

The hybrid vehicle 1 includes an engine 10 that outputs mechanical power (engine torque) from an output axis (crankshaft) 11. An internal combustion engine or external combustion engine can be considered as the engine 10. The engine 10 is controlled in its operation by an engine control unit in an electronic control unit for engine (hereinafter, referred to as an "engine ECU") 101. The engine 10 has a rotation sensor (a so-called crank angle sensor 12) to detect a rotation angle position of the output axis 11 provided therein and the crank angle sensor 12 sends a detected signal to the engine ECU 101.

The hybrid vehicle 1 also includes a motor, generator capable of driving power running, or motor/generator capable of driving both power running and regeneration as an electric power source. Here, a motor/generator 20 is taken as an example to describe the electric power source. The motor/generator 20 is constructed, for example, as a permanent-magnet AC synchronous motor and the operation thereof is controlled by an electronic control unit for motor/generator (hereinafter, referred to as an "motor/generator ECU") 102. The motor/generator 20 functions as a motor when driven for power running and converts electric energy supplied from a battery (not shown) into mechanical energy to output mechanical power (motoring torque) from a rotation axis 22 that is coaxial with a rotor 21. When driven for regeneration, on the other hand, the motor/generator 20 functions as a generator and converts mechanical energy into electric energy when mechanical power (motoring torque) is input from the rotation axis 22 to store the electric energy in the battery via an inverter (not shown) as electric power. The motor/generator 20 has a rotation sensor (resolver 23) to detect the rotation angle position of the rotor 21 (rotation axis 22) provided therein and the resolver 23 sends a detected signal to the motor/generator ECU 102.

The hybrid vehicle 1 also has a power transmission system that transmits power (engine torque or motoring torque) of the engine 10 or the motor/generator 20 to drive wheels WL, WR as a driving force provided therein.

The power transmission system can transmit power of at least one of the engine 10 and the motor/generator 20 to the drive wheels WL, WR and constitutes a transmission path of the power.

The power transmission system includes a power connecting/disconnecting device between the engine 10 and the motor/generator 20. The power connecting/disconnecting device connects/disconnects transmission of torque between the engine 10 and the drive wheels WL, WR and also connects/disconnects transmission of torque between the engine 10 and the motor/generator 20. Thus, the power connecting/disconnecting device enables switching of an engagement state in which the output axis 11 of the engine 10 and the rotation axis 22 of the motor/generator 20 are engaged and a disengagement state (non-engagement state) disengaged (non-engaged) from the engagement state.

For example, a so-called friction clutch apparatus is known as the power connecting/disconnecting device and uses a clutch 30 that switches the engagement state and disengagement state by adjusting an interval between a first engagement unit 31 and a second engagement unit 32 arranged opposite to each other. The clutch 30 connects so that the first engagement unit 31 is rotated integrally with the output axis 11 and also the second engagement unit 32 is rotated integrally with the rotation axis 22. The clutch 30 is pressure-contacted by a reduced interval between the first engagement unit 31 and the second engagement unit 32, and an engagement state connecting the output axis 11 and the rotation axis 22 is entered. The engagement state is a state in accordance with a crimping force between the first engagement unit 31 and the second engagement unit 32 and can roughly be divided into a semi-engagement state in which sliding occurs therebetween and an engagement state in which the first engagement unit 31 and the second engagement unit 32 integrally rotate with an increasing crimping force. On the other hand, the clutch 30 includes, for example, an elastic portion (not shown) that generates resiliency with a decreasing interval between the first engagement unit 31 and the second engagement unit 32 and when a force in a pressure-contact direction therebetween falls below the resiliency, a disengagement state in which the first engagement unit 31 and the second engagement unit 32 are spaced is entered.

The clutch 30 is operated by an actuator 40 and the operation thereof is controlled by an electronic control unit for clutch (hereinafter, referred to as a "clutch ECU") 103. The actuator 40 changes the interval between the first engagement unit 31 and the second engagement unit 32 and the crimping force when engaged (that is, the engagement state) in accordance with an engagement control amount and, by adjusting the engagement control amount to a desired target engagement control amount, the interval or the crimping force when engaged (engagement state) is controlled in accordance with the target engagement control amount. The clutch 30 in an engagement state has a clutch torque capacity in accordance with the target engagement control amount. On the other hand, the actuator 40 adjusts the engagement control amount to disengage the clutch 30 by making the force in the pressure-contact direction in accordance with the engagement control amount weaker than the resiliency.

It is assumed, for example, that the actuator 40 according to the first embodiment is operated by a working fluid. In this case, pressure of the working fluid becomes the engagement control amount. The actuator 40 includes a working fluid feeding apparatus 41 and a clutch driving apparatus 42. The working fluid feeding apparatus 41 includes a motor pump 41b that pressure feeds a working fluid by a driving force of a motor 41a and a working fluid channel 41c that sends a working fluid to the clutch driving apparatus 42. Though not shown, the clutch driving apparatus 42 includes an engagement control amount adjustment unit that adjusts the pressure of a working fluid fed from the working fluid feeding apparatus 41 to a target pressure (target engagement control amount), and a clutch driving unit that adjusts the interval or the crimping force when engaged (engagement state) by operating the clutch 30 in accordance with the adjusted target pressure. As the engagement control amount adjustment unit, a flow regulating valve capable of adjusting the pressure by flow control of the working fluid may be used.

It is also assumed that the working fluid feeding apparatus 41 includes a working fluid channel 41d of a working fluid to an automatic transmission 50 described later. For this reason, a hybrid ECU 100 described later is caused to control the working fluid feeding apparatus 41. The hybrid ECU 100 feeds a working fluid fed from the working fluid feeding apparatus 41 whose pressure is higher than at least a target pressure (target engagement control amount) of a working fluid in the clutch 30 and a target pressure of a working fluid in the automatic transmission 50. The working fluid is shared by the clutch 30 and the automatic transmission 50 as described above and a working fluid such as ATF (Automatic Transmission Fluid) may be used therefor. In this case, the oil pressure of a working fluid adjusted by the engagement control amount adjustment unit becomes a clutch engagement pressure as an engagement control amount of the actuator 40.

If the working fluid feeding apparatus 41 is provided as an apparatus dedicated to the clutch 30, the engagement control amount adjustment unit of the clutch driving apparatus 42 becomes unnecessary. In this case, the clutch ECU 103 may adjust the pressure of a working fluid fed from the working fluid feeding apparatus 41 to the target pressure (target engagement control amount).

Further, the power transmission system includes a transmission that changes the rotation speed (torque) between input and output in accordance with a transmission ratio, wherein power of the engine 10 or/and the motor/generator 20 is input into the transmission with steps. Here, the automatic transmission 50 with steps is illustrated. The automatic transmission 50 includes a transmission body 51 constructed of a group of gears, each of which constituting a gear ratio, and a torque converter 55 as a fluid coupling enabling power transmission between an input axis 50a into which power thereof is input and the group of gears of the transmission body 51. The input axis 50a is coupled so as to be able to rotate integrally with the rotation axis 22 of the motor/generator 20.

The transmission body 51 has a plurality of known transmission clutches (may also be called brakes) 52 to create a combination of the group of gears in accordance with the gear ratio to be controlled by connection/disconnection when the gear ratio is switched provided therein. In FIG. 1, only one unit of the transmission clutch 52 is shown for convenience of illustration. The transmission clutch 52 operates based on pressure of a fed working fluid to switch a state in which power from the engine 10 or/and the motor/generator 20 can be transmitted to the gear in accordance with the gear ratio to be controlled and a state in which the power cannot be transmitted. More specifically, each of the transmission clutches 52 is, for example, a friction clutch that has a first engagement unit 52a and a second engagement unit 52b arranged opposite to each other and creates an engagement state and a disengagement state by adjusting the interval between these engagement units opposite to each other using a working fluid fed from the working fluid feeding apparatus 41. The operation of the transmission clutch 52 is controlled by an electronic control unit for transmission (hereinafter, referred to as a "transmission ECU") 104.

An input axis 51a of the transmission body 51 is connected to a turbine runner 55a of the torque converter 55 so as to rotate integrally. Moreover, the input axis 50a of the automatic transmission 50 is connected to a pump impeller 55b of the torque converter 55 so as to rotate integrally. Thus, the input axis 51a rotates with the rotation of the input axis 50a in the torque converter 55 under control of slip.

The torque converter 55 also has a lock-up clutch 56 to integrally rotate the turbine runner 55a and the pump impeller 55b in an engagement state. The lock-up clutch 56 is a so-called friction clutch apparatus and includes a first engagement unit 56a connected so as to rotate integrally with the input axis 50a and a second engagement unit 56b connected so as to rotate integrally with the input axis 51a. In the lock-up clutch 56, the operating state (engagement state or disengagement state) between the first engagement unit 56a and the second engagement unit 56b is switched by the transmission ECU 104.

The hybrid vehicle 1 has the electronic control unit (hereinafter, referred to as the "hybrid ECU") 100 that controls the operation of the whole vehicle in a unifying fashion provided therein. The hybrid ECU 100 can exchange information such as detected signals and control commands of various sensors with each of the engine ECU 101, the motor/generator ECU 102, the clutch ECU 103, and the transmission ECU 104. In the first embodiment, a power transmission controlling apparatus is constituted of at least the hybrid ECU 100, the engine ECU 101, the motor/generator ECU 102, and the clutch ECU 103.

For the hybrid vehicle 1, an engine running mode in which the hybrid vehicle 1 runs with power of the engine 10 only, an EV running mode in which the hybrid vehicle 1 runs with power of the motor/generator 20 only, and a hybrid running mode in which the hybrid vehicle 1 runs with power of both the engine 10 and the motor/generator 20 are provided.

In EV running mode, the engine 10 is stopped to improve fuel efficiency. Then, when switching from the EV running mode to the engine running mode or the hybrid running mode in which power of the engine 10 is used, it is necessary to start the stopped engine 10. To start the engine 10, rotation torque (motoring torque) of the motor/generator 20 being driven is used for a cranking operation. Therefore, when the engine is started, the disengaged clutch 30 is engaged to transmit motoring torque to the output axis 11. The cranking operation of the engine 10 is thereby started and when an engine speed Ne rises to a predetermined target engine speed (hereinafter, referred to as a "target cranking speed") Neck, the engine 10 is started by fuel injection or the like. On a power transmission path, torque fluctuations occur accompanying engagement of the clutch 30. For example, driving torque in the drive wheels WL, WR fluctuate accompanying the engagement to cause pulling-in of the speed (slowdown). Or, for example, torque fluctuations are caused between engagement members with a difference of rotation on the power transmission path by the engagement, which causes the so-called torque shock. Thus, when the engine is started, an estimated clutch torque capacity $Tc0$ of the clutch 30 is calculated and motoring torque of the motor/generator 20 is increased by the estimated clutch torque capacity $Tc0$ to attempt to suppress torque fluctuations accompanying engagement of the clutch 30 and to suppress occurrence of pulling-in of the speed (slowdown) or a torque shock.

Incidentally, a clutch torque capacity $Tc$ of the clutch 30 is adjusted by pressure control of a working fluid of the actuator 40 and thus, there is a danger that the actual value may deviate from a target size. If the actual value deviates from the target size, a difference arises between the estimated clutch torque capacity $Tc0$ and an actual clutch torque capacity $Tcr$ of the clutch 30. If an estimation error of the estimated clutch torque capacity $Tc0$ occurs, an increase in motoring torque (MG torque compensation amount $Tmg0$) does not meet an appropriate size to suppress torque fluctuations accompanying engagement of the clutch 30 and thus, torque compensation (MG torque compensation) by appropriate motoring torque is not made. In such a case, if, for example, the MG torque compensation amount $Tmg0$ is too much, an excessive amount is transmitted to the drive wheels WL, WR, which is accelerating the hybrid vehicle 1 with acceleration not desired by the driver. On the other hand, if the MG torque compensation amount $Tmg0$ is too little, the driving force of the drive wheels WL, WR is reduced by a lacking amount, which is decelerating the hybrid vehicle 1 with deceleration not desired by the driver. Thus, in such a case, drivability is made worse because appropriate MG torque compensation is not made.

Therefore, a power transmission controlling apparatus according to the first embodiment is constructed so that feedback control is caused to absorb an estimation error of the estimated clutch torque capacity $Tc0$.

More specifically, in the hybrid vehicle 1 according to the first embodiment, the rotation axis 22 of the motor/generator 20 is connected not only to the clutch 30, but also to the torque converter 55. Therefore, when a difference arises between the estimated clutch torque capacity $Tc0$ and the actual clutch torque capacity $Tcr$, a difference of the same size also arises between an estimated value of input torque (hereinafter, referred to as "estimated AT input torque") $Tt0$ of the input axis 50a in the automatic transmission 50 and an actual value (hereinafter, referred to as "actual AT input torque") $Ttr$. The AT input torque $Tt$ is, in other words, input torque input into the torque converter 55. The estimated AT input torque $Tt0$ is calculated from, as shown by Formula 1 shown below, a capacity coefficient $Ctc$ of the torque converter 55 and the rotation speed (hereinafter, referred to as an "MG rotation speed") $Nmg$ of the motor/generator 20. On the other hand, the actual AT input torque $Ttr$ is the actual motoring torque $Tmgr$ itself. The capacity coefficient $Ctc$ is a torque map between input and output of the torque converter 55 in accordance with the speed ratio of the turbine runner 55a and the pump impeller 55b and is a high-precision value provided in advance as a design value. Regarding the MG rotation speed $Nmg$ and the actual motoring torque $Tmgr$, high-precision information is also obtained. Thus, the estimated AT input torque Tt0 and actual motoring torque Tmgr can be determined with high-precision. Therefore, by determining a difference between the estimated AT input torque Tt0 and actual current motoring torque (hereinafter, referred to as "current MG torque") Tmgn, a difference between the estimated clutch torque capacity Tc0 and the actual clutch torque capacity Tcr becomes clear. In the first embodiment, the estimated clutch torque capacity Tc0 or the MG torque compensation amount Tmg0 is corrected by using the calculated difference as a correction value.

$$Tt0 \leftarrow Ctc*Nmg^2 \qquad (1)$$

To correct the estimated clutch torque capacity Tc0, for example, an estimated clutch torque capacity correction value Tc1 (=Tt0−Tmgn) may be subtracted from a calculated value of the estimated clutch torque capacity Tc0 (Tc0←Tc0−Tc1). In this case, the estimated clutch torque capacity Tc0 after being corrected may be set as the MG torque compensation amount Tmg0. To correct the MG torque compensation amount Tmg0, on the other hand, the MG torque compensation amount Tmg0 may be determined from a calculated value of the estimated clutch torque capacity Tc0 to subtract, for example, an MG torque compensation amount correction value Tmg1 (=Tt0−Tmgn) from the MG torque compensation amount Tmg0 (Tmg0←Tmg0−Tmg1). By making such corrections, MG torque compensation can be made with the appropriate MG torque compensation amount Tmg0 so that worsening drivability due to unnecessary acceleration or deceleration can be suppressed.

The control operation when the engine 10 is started by motoring torque during EV running will be described based on the flow chart in FIG. 2.

The hybrid ECU 100 starts engine start control when starting of the engine 10 is requested (step ST1). Accordingly, the hybrid ECU 100 and the clutch ECU 103 start an engagement operation of the clutch 30. The hybrid ECU 100 and the clutch ECU 103 control the engagement control amount (a clutch engagement oil pressure Pc, which is the pressure of a working fluid) of the actuator 40 to a target engagement control amount (target clutch engagement oil pressure Pctgt). As shown in FIG. 3, the target clutch engagement oil pressure Pctgt is increased with the start of cranking and then, when the engine speed Ne rises to the target cranking speed Neck, decreased till complete detonation of the engine.

When the hybrid ECU 100 detects the start of a cranking operation of the engine 10 accompanying engagement of the clutch 30, the hybrid ECU 100 determines the estimated AT input torque Tt0 at the start of cranking (step ST2). The start of a cranking operation can be judged based on, for example, the engine speed Ne. The estimated AT input torque Tt0 is determined by substituting the MG rotation speed Nmg at the start of cranking into Formula 1.

Subsequently, the hybrid ECU 100 calculates the estimated clutch torque capacity Tc0 of the clutch 30 (step ST3). As shown in Formula 2 below, the estimated clutch torque capacity Tc0 can be determined from a friction coefficient μ of friction materials of the first engagement unit 31 and the second engagement unit 32, total area A of locations where the friction materials come into contact with each other, contact pressure Pltgt by the target clutch engagement oil pressure Pctgt, contact pressure P2 by resiliency of an elastic portion, and an outside diameter d of locations where the friction materials come into contact with each other.

$$Tc0 \leftarrow \mu*A*(P1tgt-P2)*d/2 \qquad (2)$$

The hybrid ECU 100 sets the estimated clutch torque capacity Tc0 as an increase in motoring torque (MG torque compensation amount Tmg0) (step ST4).

Then, the hybrid ECU 100 determines the absolute value of a difference between the estimated AT input torque Tt0 and the current MG torque Tmgn to determine whether the absolute value is larger than predetermined torque Tx (step ST5). This determination is intended to check whether the MG torque compensation amount Tmg0 in step ST4 can be used as it is. Thus, the predetermined torque Tx may be set, for example, to a difference between the estimated AT input torque Tt0 and the current MG torque Tmgn (amount of shift from the value to be used as the MG torque compensation amount Tmg0) that does not invite worsening of drivability and, among others, it is preferable to set the predetermined torque Tx to the largest difference. Therefore, if the absolute value is determined to be equal to or smaller than the predetermined torque Tx, the hybrid ECU 100 judges that the MG torque compensation amount Tmg0 in step ST4 may be used as it is.

On the other hand, if the absolute value is determined to be larger than the predetermined torque Tx in step ST5, the hybrid ECU 100 judges that the MG torque compensation amount Tmg0 in step ST4 should not be used as it is. Thus, the hybrid ECU 100 calculates the correction value for the MG torque compensation amount Tmg0 (hereinafter, referred to as an "MG torque compensation amount correction value") Tmg1 (step ST6). Here, as described above, the MG torque compensation amount correction value Tmg1 is calculated by subtracting the current MG torque Tmgn from the estimated AT input torque Tt0 (Tmg1←Tt0−Tmgn). Then, the hybrid ECU 100 determines the MG torque compensation amount Tmg0 at this point (step ST7). The MG torque compensation amount Tmg0 is obtained by subtracting the MG torque compensation amount correction value Tmg1 from the MG torque compensation amount Tmg0 in step ST4 (Tmg0←Tmg0−Tmg1).

After setting the MG torque compensation amount Tmg0, the hybrid ECU 100 adds the MG torque compensation amount Tmg0 to the current MG torque Tmgn to determine target MG torque Tmgtgt (=Tmgn+Tmg0) (step ST8). If a negative determination is made in step ST5, the MG torque compensation amount Tmg0 in step ST4 is used and if a positive determination is made in step ST5, the MG torque compensation amount Tmg0 in step ST7 is used. The hybrid ECU 100 causes the motor/generator ECU 102 to drive/control the motor/generator 20 based on the target MG torque Tmgtgt (step ST9).

The hybrid ECU 100 determines whether the cranking operation of the engine 10 has finished (step ST10). This determination can be made by checking whether the engine speed Ne has risen to the target cranking speed Neck.

If the cranking has not finished, the hybrid ECU 100 returns to step ST3 to repeat the MG torque compensation in the same manner as above. On the other hand, when the cranking finishes, the hybrid ECU 100 sends a command to start fuel injection or the like to the engine ECU 101 to start the engine 10 (step ST11).

Subsequently, the hybrid ECU 100 determines whether the engine 10 has detonated completely (step ST12). If the engine 10 has not detonated completely, the hybrid ECU 100 returns to step ST3 to repeat the MG torque compensation. Then, when the engine 10 detonates completely, the hybrid ECU 100 finishes the control operation.

If an estimation error of the estimated clutch torque capacity Tc0 occurs during start control of the engine 10, the estimated AT input torque Tt0 increases or decreases in accordance with the estimation error. FIG. 3 illustrates a state in which the estimated AT input torque Tt0 increases only for the estimation error (=MG torque compensation amount correction value Tmg1). In this case, the MG torque compensation amount Tmg0 is decreased only by the estimation error by starting the engine 10 according to the first embodiment so that the target MG torque Tmgtgt decreases only by the estimation error compared with that before the correction. Therefore, the hybrid vehicle 1 can avoid acceleration not desired by the user.

As described above, a power transmission controlling apparatus according to the first embodiment can absorb an estimation error of the estimated clutch torque capacity Tc0 by feedback control so that the MG torque compensation can be made with the appropriate MG torque compensation amount Tmg0 based on input torque of the torque converter 55. Thus, the power transmission controlling apparatus can suppress an increase/decrease of an unnecessary driving force of the drive wheels WL, WR while the start of engine is controlled so that worsening of drivability can be suppressed.

Second Embodiment

The second embodiment of a power transmission controlling apparatus according to the present invention will be described based on FIGS. 4 and 5.

The above mentioned power transmission controlling apparatus according to the first embodiment causes feedback control to absorb an estimation error of the estimated clutch torque capacity Tc0 each time the engine is started while the motor/generator 20 rotates. Thus, if the estimation error is large, the feedback control may diverge so that appropriate MG torque compensation may not be made.

Thus, a power transmission controlling apparatus according to the second embodiment is caused not only to exercise the feedback control in the same manner as the first embodiment, but also to learn an estimated clutch torque capacity correction value Tc2 used when the engine is started next time based on a correction value (the estimated clutch torque capacity correction value Tc1 or the MG torque compensation amount correction value Tmg1) determined during feedback control. The estimated clutch torque capacity correction value Tc2 is used to correct the estimation error of the estimated clutch torque capacity Tc0 when the engine is similarly started next time. For example, the estimated clutch torque capacity correction value Tc2 is obtained by adding up all or a plurality of correction values determined during feedback control and multiplying the result of addition by a predetermined coefficient Cc. For example, if the number of added correction values is n, the inverse thereof is set as the coefficient Cc (Cc=1/n). The plurality of correction values are those correction values extracted from all correction values because of appropriateness thereof for control and, for example, when all correction values are chronologically viewed, those correction values picked from every predetermined interval.

Figure 2:
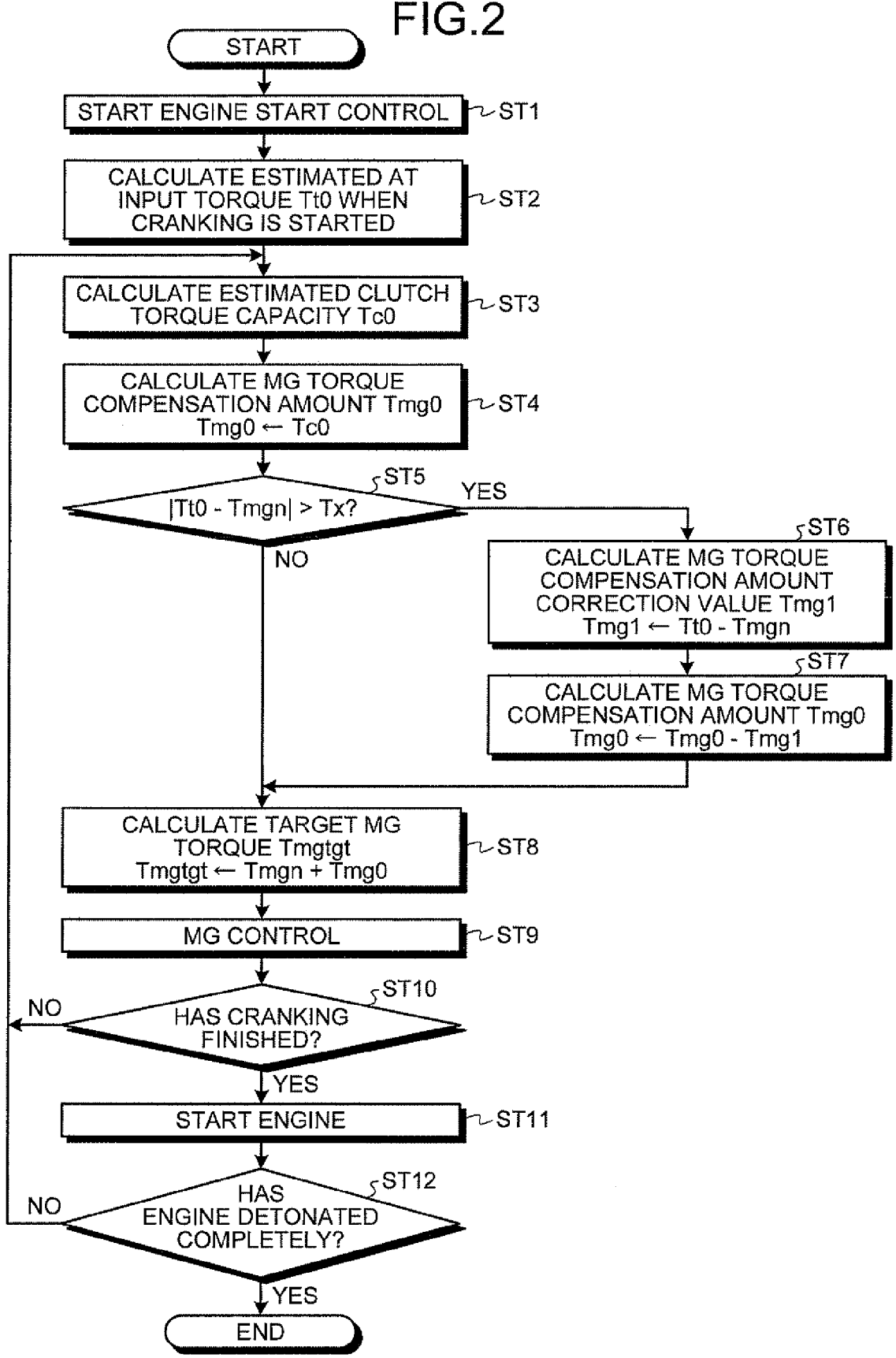
FIG. 2 is a flow chart explaining a starting operation of an engine.
Figure 3:
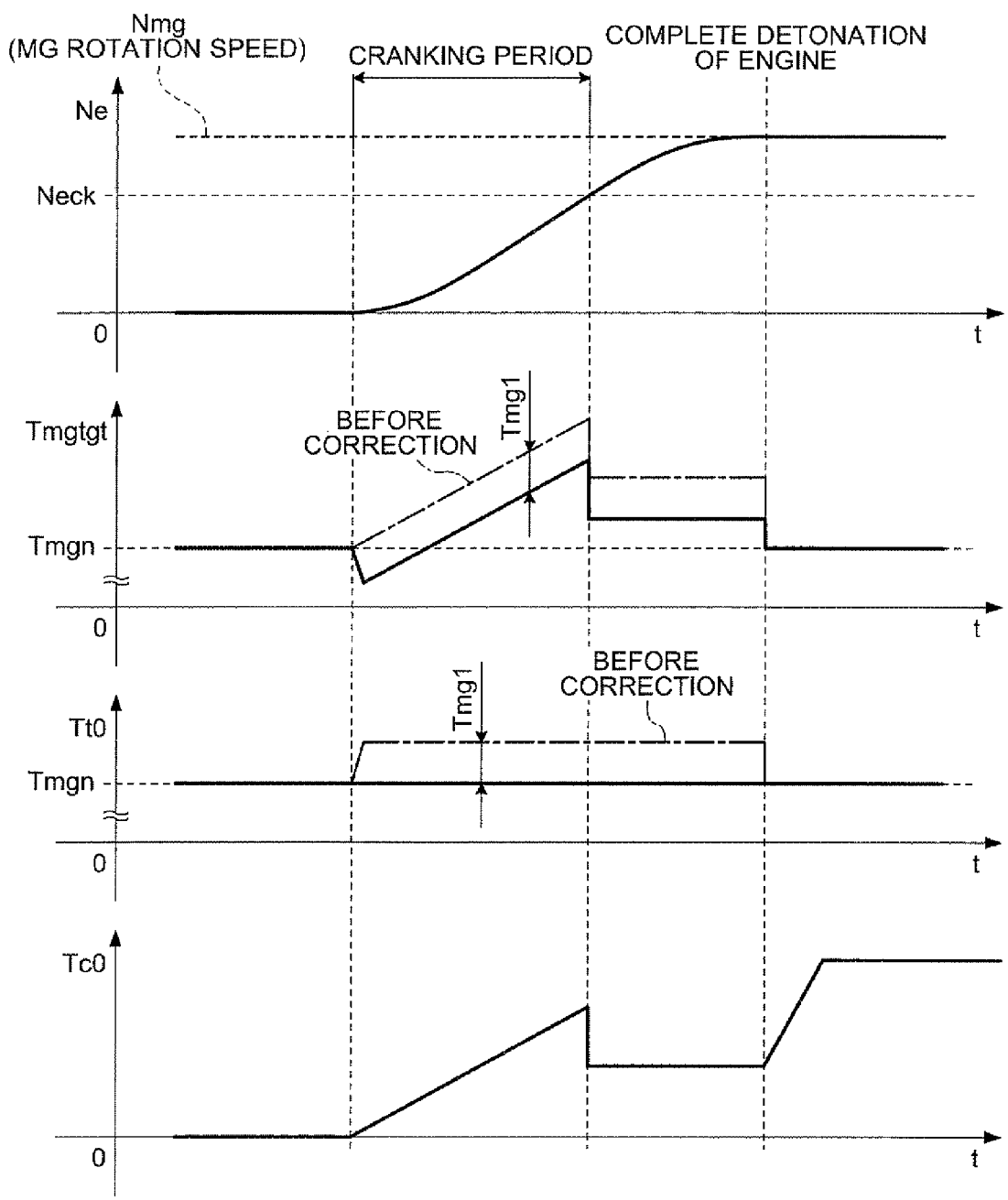
FIG. 3 is a time chart illustrating an example of relationships among an engine speed, target MG torque, estimated AT input torque, and estimated clutch torque capacity when the engine is started according to a first embodiment.

When the engine 10 is started by motoring torque during EV running, the hybrid ECU 100 according to the second embodiment exercises the same control as that in the flow chart in FIG. 2 according to the first embodiment. Accordingly, the engine 10 is started in the hybrid vehicle 1 while worsening of drivability being suppressed. During the control, the hybrid ECU 100 causes a storage device to store the MG torque compensation amount correction value Tmg1($i$) ($i$=1, 2, ..., n) in step ST6.

Figure 4:
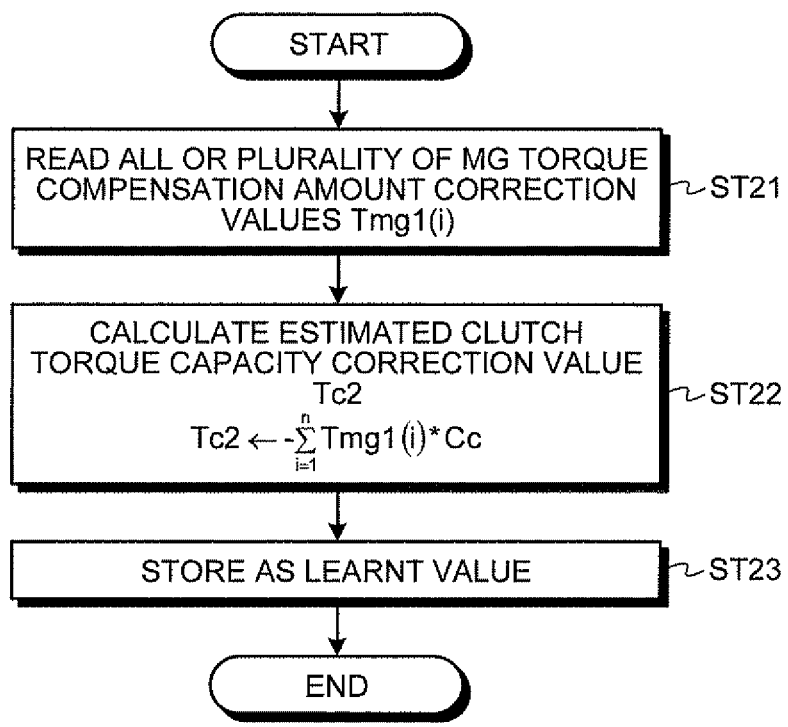
FIG. 4 is a flow chart explaining a learning control operation of an estimated clutch torque capacity correction value according to a second embodiment.
Figure 5:
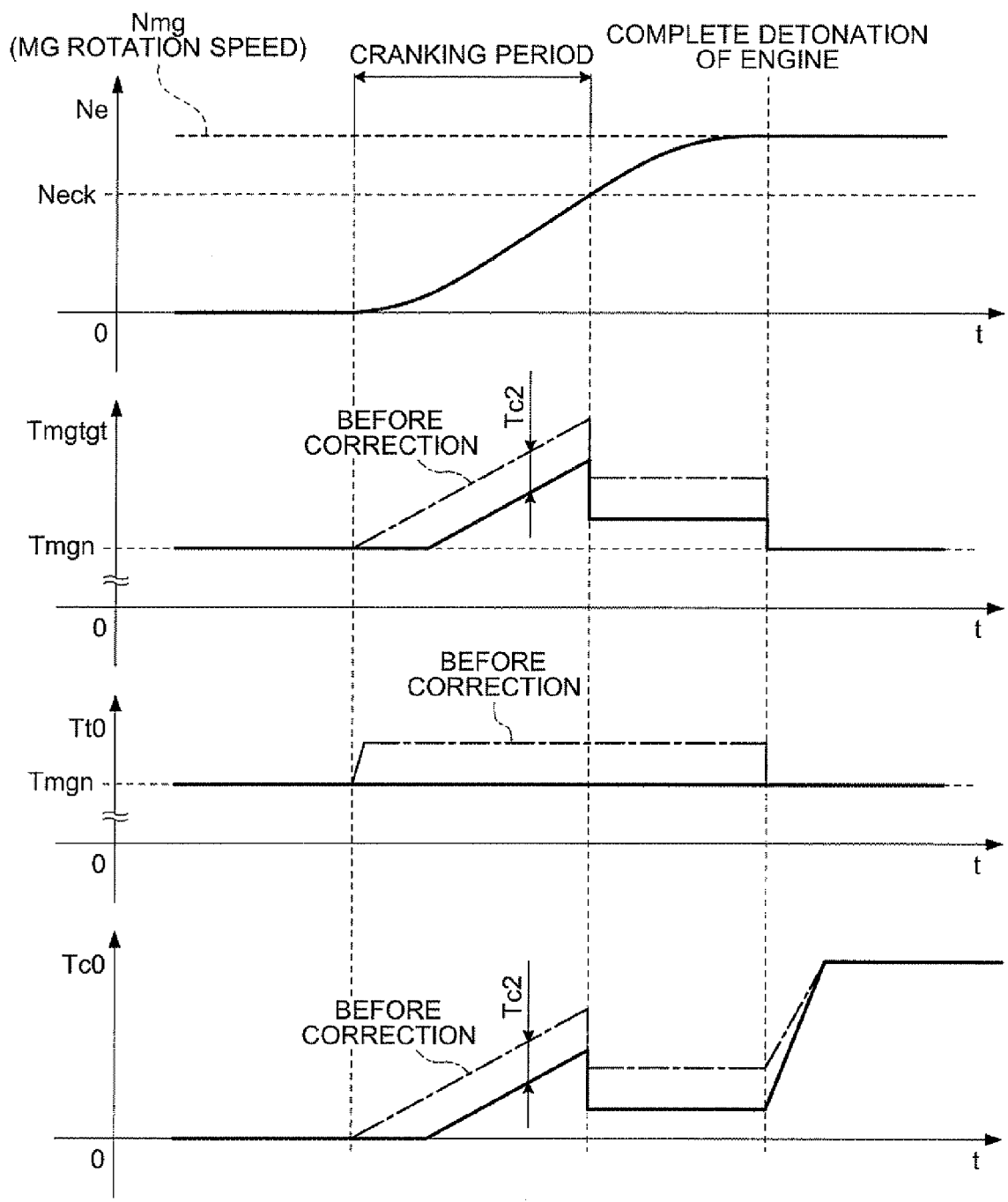
FIG. 5 is a time chart illustrating an example of relationships among the engine speed, target MG torque, estimated AT input torque, and estimated clutch torque capacity when the engine is started according to the second embodiment.

After finishing the control, as shown, for example, in the flow chart in FIG. 4, the hybrid ECU 100 reads all or a plurality of the MG torque compensation amount correction values Tmg1($i$) from the storage device (step ST21). Then, the hybrid ECU 100 adds all or the plurality of the MG torque compensation amount correction values Tmg1($i$) and multiplies the result of addition by the coefficient Cc to determine the estimated clutch torque capacity correction value Tc2 (step ST22). The hybrid ECU 100 causes the storage device to store the estimated clutch torque capacity correction value Tc2 as a learnt value (step ST23).

In step ST3 when the engine is started next time during EV running, the hybrid ECU 100 subtracts the estimated clutch torque capacity correction value Tc2 in the storage device from the estimated clutch torque capacity Tc0 determined by using Formula 2 and sets the result of subtraction as the estimated clutch torque capacity Tc0 at this point (Tc0←Tc0−Tc2).

When the engine is started, the estimated clutch torque capacity Tc0 after being corrected is set as the MG torque compensation amount Tmg0 in step ST4. Accordingly, variations of the estimated clutch torque capacity Tc0 after being corrected and the MG torque compensation amount Tmg0 are reduced. Thus, if the MG torque compensation amount Tmg0 already has an appropriate value, the hybrid ECU 100 can make a negative determination in step ST5 to make appropriate MG torque compensation. In the illustration in FIG. 5, the estimated clutch torque capacity Tc0 decreases by the estimated clutch torque capacity correction value Tc2 compared with that before the correction and correspondingly, the MG torque compensation amount Tmg0 also decreases by the estimated clutch torque capacity correction value Tc2 compared with that before the correction. Therefore, the target MG torque Tmgtgt is reduced by the estimated clutch torque capacity correction value Tc2 compared with that before the correction. Since it is not possible to make the clutch torque capacity Tc a negative value, the estimated clutch torque capacity Tc0 and the MG torque compensation amount Tmg0 for a predetermined period after the start of cranking are set to 0.

On the other hand, even if the MG torque compensation amount Tmg0 based on the estimated clutch torque capacity Tc0 after being corrected is not yet an appropriate value, the hybrid ECU 100 makes a positive determination in step ST5 to correct the MG torque compensation amount Tmg0 to an appropriate value so that appropriate MG torque compensation can be made.

As described above, a power transmission controlling apparatus according to the second embodiment absorbs an estimation error of the estimated clutch torque capacity Tc0 by feedback control so that the MG torque compensation can be made with the appropriate MG torque compensation amount Tmg0. Further, the power transmission controlling apparatus learns the estimated clutch torque capacity correction value Tc2 based on the MG torque compensation amount correction values Tmg1($i$) during feedback control. Thus, the power transmission controlling apparatus can not only suppress worsening of drivability while the start of engine is controlled in real time, but also reduce variations of the estimated clutch torque capacity TC0 and the MG torque compensation amount Tmg0 based on the estimated clutch torque capacity correction value Tc2 while the start of engine is controlled next time and suppress worsening of drivability at that point.

Incidentally, while the storage device is caused to once store the MG torque compensation amount correction values Tmg1($i$) and after the feedback control is finished, the estimated clutch torque capacity correction value Tc2 is made to calculate based on the MG torque compensation amount correction values Tmg1($i$) in the second embodiment, the calculation may be made to perform during feedback control. For example, the hybrid ECU 100 may be made to add each time the MG torque compensation amount correction value Tmg1(i) is calculated and, after all the MG torque compensation amount correction values Tmg1(i) being determined, to multiply by the coefficient Cc to determine the estimated clutch torque capacity correction value Tc2.

While the estimated clutch torque capacity correction value Tc2 is determined by using all or a plurality of the MG torque compensation amount correction values Tmg1(i) in the second embodiment, one of the MG torque compensation amount correction values Tmg1(i) calculated while the start of engine is controlled may be set directly as the estimated clutch torque capacity correction value Tc2. If each of the MG torque compensation amount correction values Tmg1(i) does not differ much from each other, that is, variations of the estimated clutch torque capacity Tc0 (MG torque compensation amount Tmg0) are small, the estimated clutch torque capacity correction value Tc2 is useful.

While a correction value (the estimated clutch torque capacity correction value Tc2) for the estimated clutch torque capacity Tc0 when the start of engine is controlled next time is made to learn in the second embodiment, the correction value may be made to learn intended for the MG torque compensation amount Tmg0 when the start of engine is controlled next time. The correction value (MG torque compensation amount correction value Tmg2) is the same value as the estimated clutch torque capacity correction value Tc2.

Third Embodiment

Figure 7:
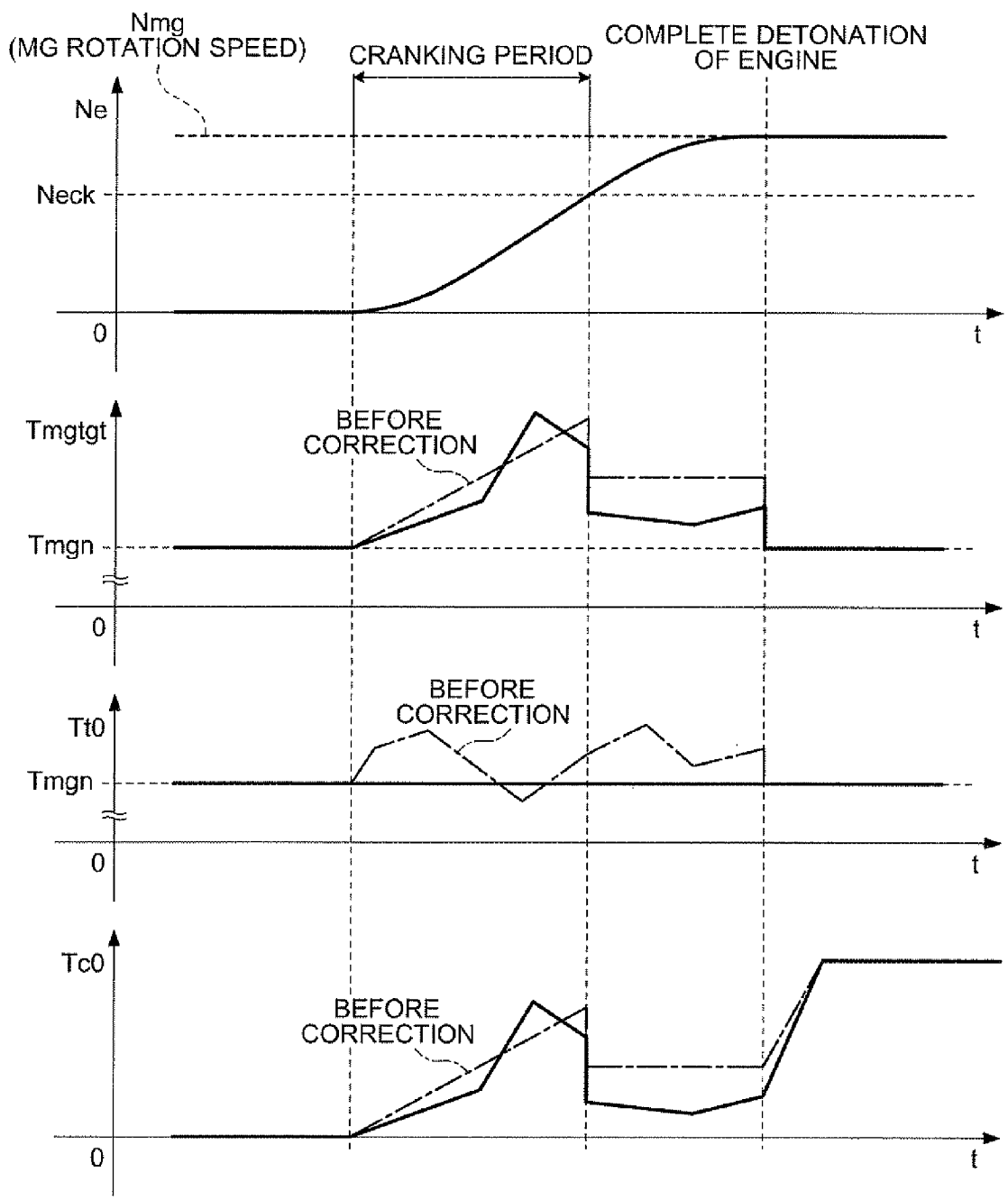
FIG. 7 is a time chart illustrating an example of relationships among the engine speed, target MG torque, estimated AT input torque, and estimated clutch torque capacity when the engine is started according to the third embodiment.
Figure 8:
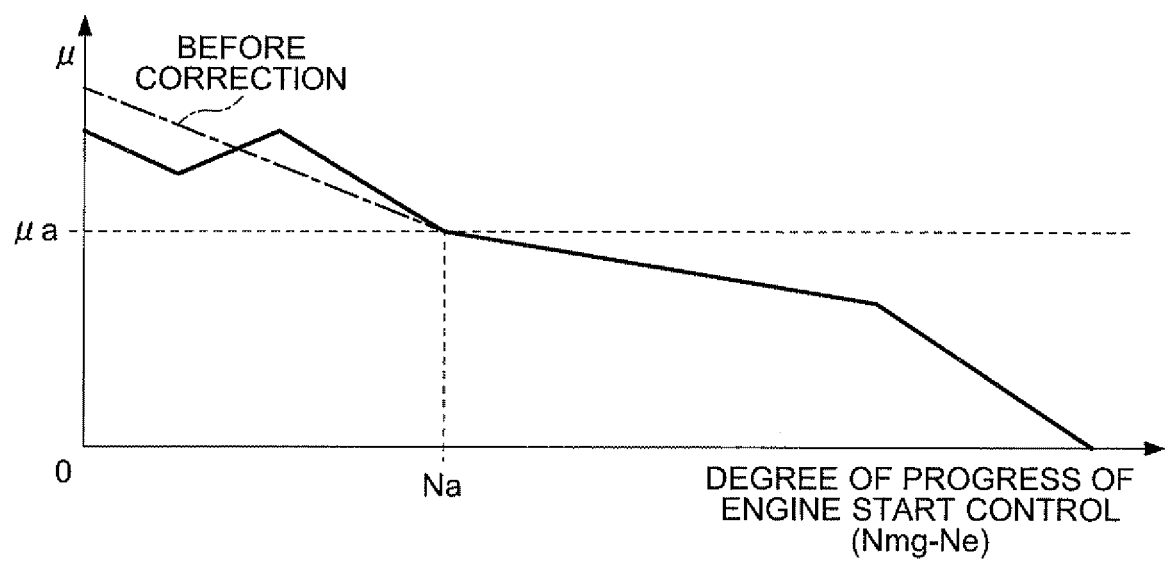
FIG. 8 is a diagram illustrating an example of map data of the friction coefficient.

The third embodiment of a power transmission controlling apparatus according to the present invention will be described based on FIGS. 6 to 8.

When there arises a difference between the MG rotation speed Nmg and the engine speed Ne when the engine is started during EV running, a characteristic value (friction coefficient $\mu$ of the first engagement unit 31 and the second engagement unit 32) of the clutch 30 changes according to the difference. In this case, an estimation error of the estimated clutch torque capacity Tc0 also changes in accordance with the change of the friction coefficient $\mu$. The difference between the MG rotation speed Nmg and the engine speed Ne changes with some kind of regularity according to the degree of progress of clutch engagement control in the clutch 30. Thus, the friction coefficient $\mu$ can be considered to have change characteristics in accordance with the degree of progress of the clutch engagement control, but does not show a uniform change during clutch engagement control. Therefore, variations of the estimated clutch torque capacity Tc0 are no longer uniform and even if a learning effect (estimated clutch torque capacity correction value Tc2) is reflected in the estimated clutch torque capacity Tc0 like the second embodiment, a correction cannot be made to the appropriate estimated clutch torque capacity Tc0 needed for MG torque compensation.

Thus, a power transmission controlling apparatus according to the third embodiment is caused not only to exercise the feedback control like the first embodiment, but also to learn a correction value of the friction coefficient $\mu$ (hereinafter, referred to as a "friction coefficient correction value") $\mu1$ used when the engine is started next time based on a correction value (the estimated clutch torque capacity correction value Tc1 or the MG torque compensation amount correction value Tmg1) determined during feedback control. The friction coefficient correction value $\mu1$ is used to correct the change of the friction coefficient $\mu$ in accordance with the degree of progress of the clutch engagement control when the engine is similarly started next time. Thus, the friction coefficient correction value $\mu1$ is a value obtained by multiplying a correction value determined during feedback control by a predetermined coefficient C$\mu$ and each time the correction value is calculated, the storage device is caused to store the correction value as a learnt value associated with the degree of progress of the engine start control. The coefficient C$\mu$ is a conversion factor that converts the correction value (the estimated clutch torque capacity correction value Tc1 or the MG torque compensation amount correction value Tmg1) into the friction coefficient $\mu$ of the clutch 30.

When the engine 10 is started by motoring torque during EV running, the hybrid ECU 100 according to the third embodiment exercises the same control as that in the flow chart in FIG. 2 according to the first embodiment. Accordingly, the engine 10 is started in the hybrid vehicle 1 while worsening of drivability being suppressed.

Figure 6:
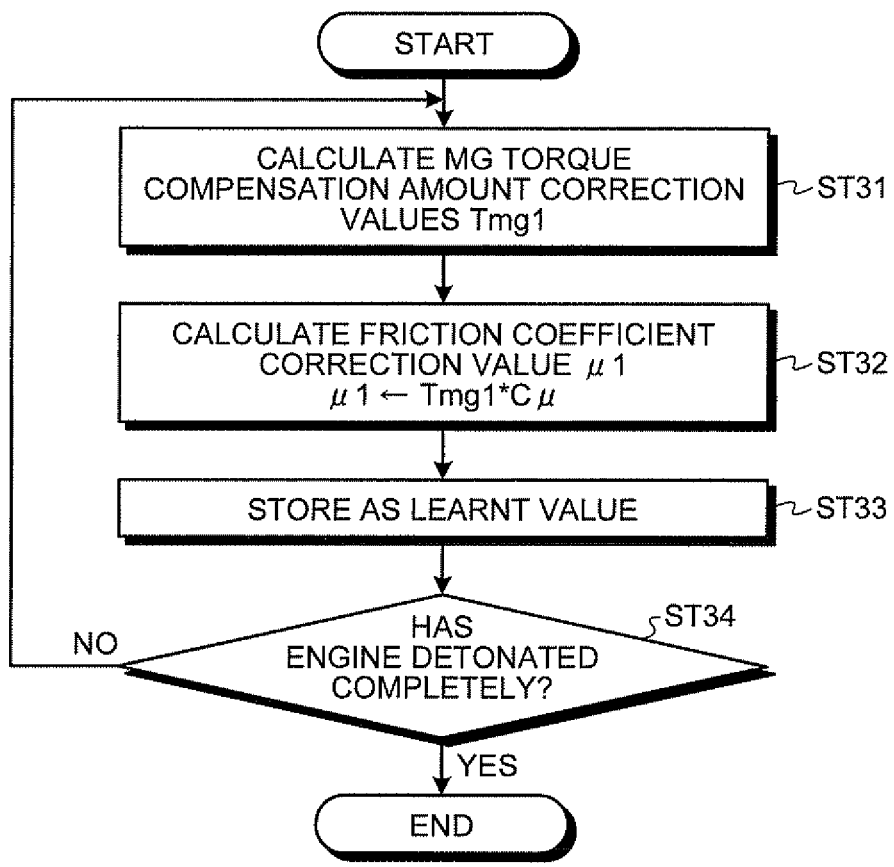
FIG. 6 is a flow chart explaining the learning control operation of a friction coefficient correction value according to a third embodiment.

While the control being exercised, as shown in the flow chart in FIG. 6, after the MG torque compensation amount correction value Tmg1 being calculated (step ST31), the hybrid ECU 100 multiplies the MG torque compensation amount correction value Tmg1 by the coefficient C$\mu$ to determine a friction coefficient correction value $\mu1$ (step ST32). Then, the hybrid ECU 100 stores the friction coefficient correction value $\mu1$ in the storage device together with information about the degree of progress of the clutch engagement control (step ST33). As information about the degree of progress, information about a difference between the MG rotation speed Nmg and the engine speed Ne when the MG torque compensation amount correction value Tmg1 is calculated may be used. Or, time information may be used as information about the degree of progress. In this case, for example, the elapsed time from the start of cranking as the starting point can be used as information about the degree of progress of the clutch engagement control.

Subsequently, the hybrid ECU 100 determines whether the engine 10 has detonated completely (step ST34). If the engine 10 has not detonated completely, the hybrid ECU 100 judges that another MG torque compensation amount correction value Tmg1 may be calculated and returns to step ST31. On the other hand, if the engine 10 has detonated completely, the hybrid ECU 100 finishes the control operation.

The friction coefficient correction value $\mu1$ determined for each of the MG torque compensation amount correction values Tmg1 is used for calculation of the estimated clutch torque capacity Tc0 in step ST3. In that case, instead of Formula 2, for example, Formula 3 below is used:

$$Tc0 \leftarrow (\mu - \mu1)*A*(P1tgt - P2)*d/2 \quad (3)$$

In step ST3, the hybrid ECU 100 reads the friction coefficient correction value $\mu1$ in accordance with the degree of progress of the clutch engagement control from the storage device and substitutes the friction coefficient correction value $\mu1$ into Formula 3. This calculation is repeated as the clutch engagement control progresses. Thus, if variations of the estimated clutch torque capacity Tc0 are not uniform, the estimated clutch torque capacity Tc0 corrected by the friction coefficient correction value $\mu1$ changes as shown in FIG. 7 with respect to the estimated clutch torque capacity Tc0 before being corrected. Accordingly, even if variations of the estimated clutch torque capacity Tc0 are not uniform in accordance with the degree of progress of the clutch engagement control, the variations can be reduced.

The estimated clutch torque capacity Tc0 after being corrected becomes the MG torque compensation amount Tmg0 in step ST4. Thus, if the MG torque compensation amount Tmg0 already has an appropriate value, the hybrid ECU 100 can make a negative determination in step ST5 to make appropriate MG torque compensation. In the illustration in FIG. 7, the target MG torque Tmgtgt also increases/decreases in accordance with a changed state of the estimated clutch torque capacity Tc0 after being corrected. Therefore, appropriate MG torque compensation is made when the engine is started. On the other hand, even if the MG torque compensation amount Tmg0 is not yet an appropriate value, the hybrid ECU 100 makes a positive determination in step ST5 to correct the MG torque compensation amount Tmg0 to an appropriate value so that appropriate MG torque compensation can be made.

As described above, a power transmission controlling apparatus according to the third embodiment absorbs an estimation error of the estimated clutch torque capacity Tc0 by feedback control so that the MG torque compensation can be made with the appropriate MG torque compensation amount Tmg0. Further, the power transmission controlling apparatus learns the friction coefficient correction value µ1 in accordance with the degree of progress of the clutch engagement control based on the MG torque compensation amount correction values Tmg1 during the feedback control. Thus, even if variations of the estimated clutch torque capacity Tc0 are not uniform in accordance with the degree of progress of the clutch engagement control, the variations can be reduced when the start of engine is controlled next time and thus, variations of the MG torque compensation amount Tmg0 can also be reduced. Therefore, the power transmission controlling apparatus can not only suppress worsening of drivability when the start of engine is controlled in real time, but also suppress worsening of drivability when the start of engine is controlled next time.

While the friction coefficient correction value µ1 that causes an addition or a subtraction on the friction coefficient µ is illustrated in the third embodiment, the learnt value may be, for example, a correction coefficient Cµ1 by which the friction coefficient µ is multiplied. In this case, the above coefficient Cµ is set as a conversion factor to cause a conversion to the correction coefficient Cµ1. Also in this case, instead of Formula 3 above, Formula 4 shown below may be used:

$$Tc0 \leftarrow \mu * C\mu 1 * A * (P1tgt - P2) * d/2 \quad (4)$$

Further, the learnt value may be, instead of the friction coefficient correction value µ1 or the correction coefficient Cµ1, the friction coefficient µ after being corrected determined by using these values. In this case, map data of the friction coefficient µ in accordance with the degree of progress of the clutch engagement control (difference between the MG rotation speed Nmg and the engine speed Ne), as shown, for example, in FIG. 8, is stored in the storage device and the map data is caused to store a correction value in accordance with the friction coefficient correction value µ1 or the correction coefficient Cµ1 of the friction coefficient µ. FIG. 8 is an example of correction made when the difference between the MG rotation speed Nmg and the engine speed Ne is smaller than "Na".

Further, the third embodiment is illustrated by assuming that the friction coefficient µ is to be corrected, but like the first and second embodiments, the third embodiment may be configured to allow the estimated clutch torque capacity Tc0 or the MG torque compensation amount Tmg0 to be corrected. Accordingly, even if variations of the estimated clutch torque capacity Tc0 or the MG torque compensation amount Tmg0 are not uniform, variations thereof can be reduced. For example, the hybrid ECU 100 is caused to determine the estimated clutch torque capacity correction value Tc1 or the MG torque compensation amount correction value Tmg1 described above in accordance with the degree of progress of the clutch engagement control and to cause the storage device to store the estimated clutch torque capacity correction value Tc1 or the MG torque compensation amount correction value Tmg1 by associating with the degree of progress of the clutch engagement control. Then, when the engine is started next time, the estimated clutch torque capacity correction value Tc1 or the MG torque compensation amount correction value Tmg1 in the storage device is used to correct the estimated clutch torque capacity Tc0 or the MG torque compensation amount Tmg0. The hybrid ECU 100 may also be caused to determine the estimated clutch torque capacity correction value Tc2 or the MG torque compensation amount correction value Tmg2 described above in accordance with the degree of progress of the clutch engagement control and to cause the storage device to store the estimated clutch torque capacity correction value Tc2 or the MG torque compensation amount correction value Tmg2 by associating with the degree of progress of the clutch engagement control. In this case, when the engine is started next time, the estimated clutch torque capacity correction value Tc2 or the MG torque compensation amount correction value Tmg2 in the storage device is used to correct the estimated clutch torque capacity Tc0 or the MG torque compensation amount Tmg0. When configured in this manner, the power transmission controlling apparatus can not only suppress worsening of drivability when the start of engine is controlled in real time, but also suppress worsening of drivability when the start of engine is controlled next time.

INDUSTRIAL APPLICABILITY

A power transmission controlling apparatus according to the present invention is useful, as described above, as a technology to make MG torque compensation with precision when a mechanical power source is started while an electric power source is rotating.

REFERENCE SIGNS LIST

1 HYBRID VEHICLE
10 ENGINE (MECHANICAL POWER SOURCE)
20 MOTOR/GENERATOR (ELECTRIC POWER SOURCE)
30 CLUTCH
40 ACTUATOR
41 WORKING FLUID FEEDING APPARATUS
42 CLUTCH DRIVING APPARATUS
50 AUTOMATIC TRANSMISSION
50a INPUT AXIS
55 TORQUE CONVERTER
100 HYBRID ECU
101 ENGINE ECU
102 MOTOR/GENERATOR ECU
103 CLUTCH ECU
104 TRANSMISSION ECU
WL, WR DRIVE WHEEL

The invention claimed is:

1. A power transmission controlling apparatus of a vehicle, comprising:
a power connecting/disconnecting device that has an engagement unit capable of connecting/disconnecting power transmission between a mechanical power source and an electric power source; and
a fluid coupling that enables power transmission between the mechanical power source or/and the electric power source and a transmission, where the power connecting/disconnecting device and the fluid coupling are disposed on a power transmission path on which power of at least one of the mechanical power source generating a driving force by using mechanical energy and the electric power source generating the driving force by using the mechanical energy obtained by converting electric energy can be transmitted to drive wheels, and when the mechanical power source is started by the power of the electric power source with engagement of the power connecting/disconnecting device during rotation of a rotation axis of the electric power source, the power transmission controlling apparatus sets a torque compensation amount by the electric power source based on an estimated torque capacity of the power connecting/disconnecting device and suppresses torque fluctuations on the power transmission path accompanying the engagement of the power connecting/disconnecting device by the power of the electric power source containing the torque compensation amount, wherein the power transmission controlling apparatus corrects the torque capacity or the torque compensation amount based on input torque of the fluid coupling.

2. The power transmission controlling apparatus according to claim 1, wherein the power transmission controlling apparatus sets a difference between input torque of the fluid coupling and torque of the electric power source containing the torque compensation amount as a correction value for the torque capacity or the torque compensation amount.

3. The power transmission controlling apparatus according to claim 1, wherein the power transmission controlling apparatus sets a correction value determined based on input torque of the fluid coupling as a correction value for the torque capacity or the torque compensation amount when the mechanical power source is started next time.

4. The power transmission controlling apparatus according to claim 1, wherein the power transmission controlling apparatus determines a correction value for the torque capacity or the torque compensation amount when the mechanical power source is started next time, based on all or a plurality of correction values determined based on input torque of the fluid coupling.

5. The power transmission controlling apparatus according to claim 1, wherein the power transmission controlling apparatus determines a correction value associated with a degree of progress of engagement control of the power connecting/disconnecting device based on input torque of the fluid coupling, and sets the correction value as a correction value for the torque capacity or the torque compensation amount when the mechanical power source is started next time.

6. The power transmission controlling apparatus according to claim 1, wherein the power transmission controlling apparatus determines a correction value associated with a degree of progress of engagement control of the power connecting/disconnecting device based on input torque of the fluid coupling, and determines a correction value for the torque capacity or the torque compensation amount when the mechanical power source is started next time based on all or a plurality of the correction values.

7. The power transmission controlling apparatus according to claim 1, wherein the power transmission controlling apparatus determines a correction value associated with a degree of progress of engagement control of the power connecting/disconnecting device based on input torque of the fluid coupling, corrects a characteristic value of the power connecting/disconnecting device based on the correction value, and estimates the torque capacity using the characteristic value after being corrected.

8. The power transmission controlling apparatus according to claim 7, wherein the power transmission controlling apparatus determines a correction value for a characteristic value of the power connecting/disconnecting device based on a correction value associated with a degree of progress of engagement control of the power connecting/disconnecting device.

* * * * *